April 5, 1949.                    W. G. FOULDS                    2,466,167
                          FAST AND SLOW SPEED DRIVING
                            MEANS FOR ELECTRIC LIFTS
                             Filed March 21, 1946

Patented Apr. 5, 1949

2,466,167

UNITED STATES PATENT OFFICE 2,466,167

FAST AND SLOW SPEED DRIVING MEANS FOR ELECTRIC LIFTS

William Geoffrey Foulds, Colne, England

Application March 21, 1946, Serial No. 655,991
In Great Britain February 6, 1945

Section 1, Public Law 690, August 8, 1946
Patent expires February 6, 1965

4 Claims. (Cl. 318—8)

This invention relates to fast and slow speed driving means for electric lifts and the like such as electric cranes where a relatively wide range of fast and slow speeds is required and A. C. supply is available.

Hitherto, such speed variation has been obtained either by variable speed gearing or by the use of variable speed electric motors, usually D. C. motors owing to the known limitations of speed variation of A. C. motors. The use of change-speed gearing has many inherent disadvantages also the use of D. C. variable speed motors entails the additional installation of a rotary converter or a very large rectifier.

The object of the present invention is an improved driving means having the advantages of a wide range between fast and slow speeds without the disadvantages of gearing or D. C. converter as above explained.

According to the invention fast and slow change-speed driving means for electric lifts and like mechanism operating on A. C. supply comprises in combination alternative fast A. C. and slow D. C. driving motors, a low wattage means for producing high and low voltage D. C. supply from the A. C. supply, a regenerative braking circuit for the D. C. motor having its resistance element permanently shunted across the armature, a rectifier shunt protector circuit for the field of the D. C. motor, and switch means for selectively operating one or other of the motors and for changing from fast A. C. drive to slow D. C. drive including a controlling relay in and actuated by the said regenerative braking circuit and arranged to break and make the high voltage D. C. field supply to the D. C. motor until the regenerative voltage reaches that for the predetermined slow speed and thereafter to complete and maintain the high voltage D. C. supply to the field and a low voltage D. C. supply to the armature.

In the drawings filed herewith:

Figure 1:
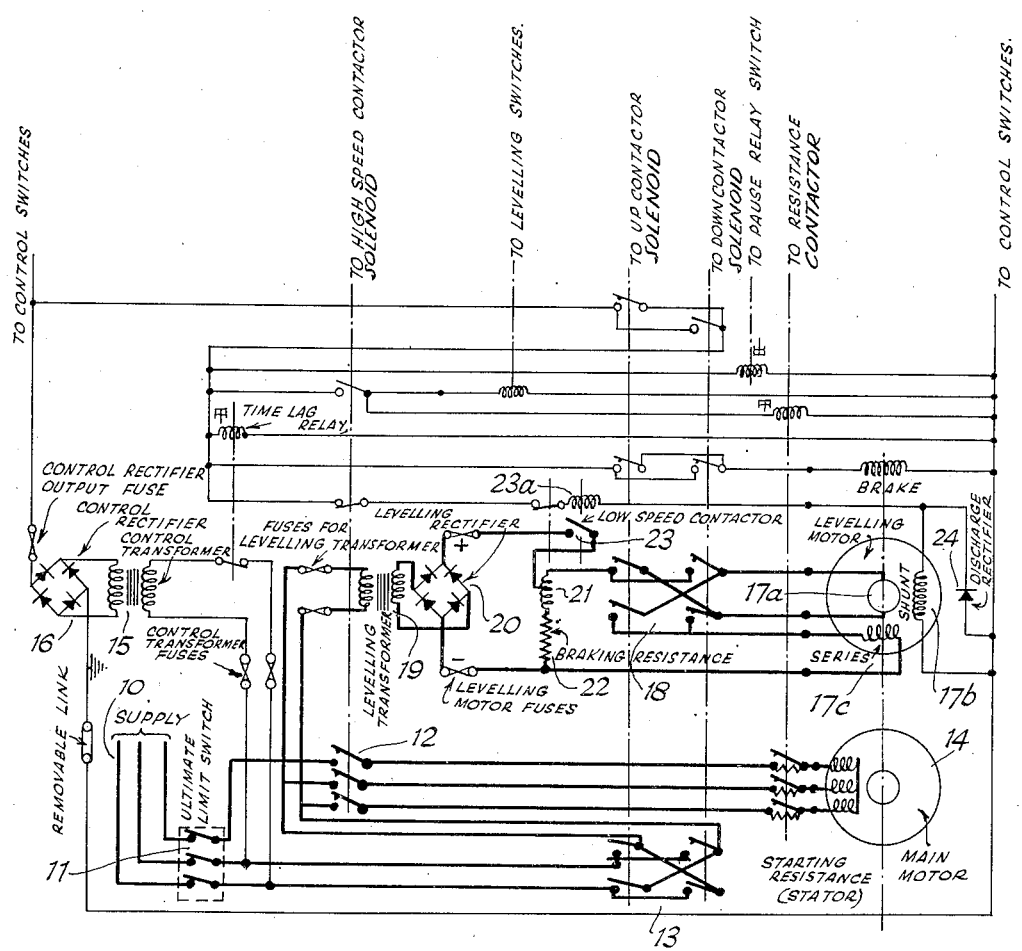
Fig. 1 is a wiring diagram illustrating one example of the invention.
Figure 2:
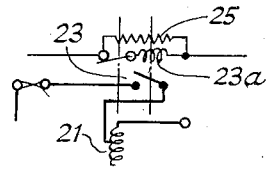
Fig. 2 is a fragmentary view showing a modification.

As shown in the drawing 10 represents a 3-phase 400 volt A. C. mains supply with the usual ultimate limit switch 11, contactors 12 and reversing switch 13 for the A. C. motor 14. The controlling mechanism is electrically operated by transformer 15 and rectifier 16 which provides 220 volt D. C. supply. A slow speed D. C. motor 17 with armature 17a, shunt field 17b and series field 17c is provided, coupled to the shaft of the A. C. motor or built into one unit and this has a reversing switch 18 coupled for simultaneous action to the reversing switch 13 of the A. C. motor. A low voltage and low wattage D. C. supply is provided by a transformer 19 and a metal rectifier 20. The armature 17a of the D. C. motor is permanently shunted by vibrating type (make-and-break) relay 21 and a braking resistance 22, forming part of the regenerative circuit, the relay 21 including a switch in the circuit of the field 17b of the D. C. motor and controlling high voltage D. C. supply to such field from the rectifier 16. In the circuit to the field 17b is a relay 23 with coil 23a arranged to operate the main D. C. supply to the armature 17a which is tapped into the energising coil of the relay 21 and reaches the armature through the reversing switch 18 aforesaid. The remainder of the diagram shows the usual arrangement of floor and cage contacts, and selecting mechanism necessary for the complete wiring installation. A discharge rectifier 24 is provided across the shunt field winding 17b.

In operation, assuming the lift is moving under the control of the A. C. motor, when the lift approaches the selected floor, the selector mechanism cuts off the A. C. motor and the levelling switch takes charge switching on the high voltage D. C. supply to the field 17b of the D. C. motor so that the latter operates as a brake through the regenerative circuit including the resistance 22. As the instantaneous regenerative voltage will be high, compared with the final low D. C. running voltage for the rectifier 20, the relay 21 will break the D. C. field supply so that the flux will decay gradually through the rectifier 24. The relay 21 will make-and-break until the regenerative voltage, which is proportional to the motor speed, falls to predetermined value, when the relay 21 finally holds the D. C. shunt field circuit closed. During this make-and-break action of the relay 21 the relay 23 will not operate as the field current through its coil 23a never attains full value but as soon as the relay 21 has closed finally then relay 23 switches on the low voltage D. C. supply to the armature and the D. C. motor then continues to drive the lift at the slow speed for which it is designed. The levelling switch will stop the lift at the selected floor by breaking the circuit at the reversing switch 18. Of course, if the lift has overshot the floor, the reversing switch will reverse the operation of the D. C. motor so that after it has acted as a regenerative brake to stop the lift it will be switched on to bring the lift back to the landing on the slow speed.

In a modification, instead of a vibrating type make-and-break relay 21 an ordinary relay is used and a resistance 25 of relatively low value is shunted across the contacts of such ordinary relay and the coil 23a. When the regenerative current in the coil of the relay 21 has fallen below a predetermined maximum the relay 21 closes, energising the coil 23a and closing the circuit between the armature 17a and the rectifier. Thus the relays 21 and 23 have the sole function of determining the closing of the armature circuit when the motor is slowed down to a safe speed for this to be done. The modification provides better braking torque as the field circuit 17b is thus energised almost at its full strength through the shunting resistance even when the contacts of the relay 21 are open.

What I claim is:

1. Fast and slow change-speed driving mechanism for electric lifts and like mechanism comprising in combination an A. C. electric motor for fast speed movement of the lift, a D. C. electric motor with a regenerative braking circuit for braking and levelling of the lift and switch means for alternative operation of the A. C. and D. C. motors for movement of the lift.

2. Fast and slow change-speed driving mechanism for electric lifts and like mechanism comprising in combination an A. C. electric motor for fast speed movement of the lift, a D. C. electric motor with a regenerative braking circuit for braking and levelling of the lift and switch means for alternative operation of the A. C. and D. C. motors for movement of the lift, said switch means including a relay operable by the regenerative braking circuit for controlling D. C. supply to the D. C. motor.

3. Fast and slow change-speed driving mechanism for electric lifts and like mechanism comprising in combination an A. C. electric motor for fast speed movement of the lift, a D. C. electric motor with a regenerative braking circuit for braking and levelling of the lift and switch means for alternative operation of the A. C. and D. C. motors for movement of the lift, said mechanism including a rectifier connected to the A. C. supply for supplying D. C. for the D. C. motor and shunted across the said regenerative circuit, a relay operable by the said regenerative circuit and controlling the rectifier circuit so that the latter can only be connected to the D. C. motor when the regenerative voltage is below a predetermined maximum.

4. Fast and slow change-speed driving means for electric lifts and like mechanism operating on A. C. supply comprising in combination alternative fast A. C. and slow D. C. driving motors, a low wattage means for producing high and low voltage D. C. supply from the A. C. supply, a regenerative braking circuit for the D. C. motor having its resistance element permanently shunted across the armature, a rectifier shunt protector circuit for the field of the D. C. motor, and switch means for selectively operating one or other of the motors and for changing from fast A. C. drive to slow D. C. drive including a controlling vibrating type relay in and actuated by the said regenerative braking circuit and arranged to break and make the high voltage D. C. field supply to the D. C. motor until the regenerative voltage reaches that for the predetermined slow speed and thereafter to complete and maintain the high voltage D. C. supply to the field and a low voltage D. C. supply to the armature.

WILLIAM GEOFFREY FOULDS.

REFERENCES CITED

The following references are of record in the file of this patent:

UNITED STATES PATENTS

| Number | Name | Date |
|---|---|---|
| 853,771 | Merrill | May 14, 1907 |
| 2,379,072 | Feldhausen | June 26, 1945 |